Feb. 14, 1961 T. H. BONN 2,972,129

GATE-BUFFER CHAINS

Filed June 25, 1956 3 Sheets-Sheet 1

INVENTOR.
THEODORE H. BONN
BY
Charles C. English
AGENT

Feb. 14, 1961 T. H. BONN 2,972,129

GATE-BUFFER CHAINS

Filed June 25, 1956 3 Sheets-Sheet 2

INVENTOR.
THEODORE H. BONN
BY
Charles C. English
AGENT

Feb. 14, 1961 T. H. BONN 2,972,129

GATE-BUFFER CHAINS

Filed June 25, 1956 3 Sheets-Sheet 3

*INVENTOR.*

BY THEODORE H. BONN

Charles C. English

AGENT 2,972,129
Patented Feb. 14, 1961

2,972,129

GATE-BUFFER CHAINS

Theodore H. Bonn, Merion Station, Pa., assignor to Sperry Rand Corporation, New York, N.Y., a corporation of Delaware Filed June 25, 1956, Ser. No. 593,537

7 Claims. (Cl. 340—174)

This invention relates to gate-buffer chains, and more particularly to such chains utilizing magnetic elements, wherein identical electric networks may operate either as gates or as buffers.

In prior applications, I have disclosed magnetic gates and buffers, per se, and in some cases chains of magnetic gates and buffers. These prior applications include my applications Serial No. 461,968, filed October 13, 1954, entitled "Gating Circuits Employing Magnetic Amplifiers"; Serial No. 465,624, filed October 29, 1954, entitled "Magnetic Amplifier Circuit Having a Plurality of Control Inputs"; Serial No. 497,727, filed March 29, 1955, entitled "Magnetic Gating on Core Inputs," now Patent 2,907,894; Serial No. 528,463, filed August 15, 1955, entitled "Magnetic Gates and Buffers"; the application of John Presper Eckert, Jr., and Theodore H. Bonn Serial No. 530,301, filed August 24, 1955, entitled "Regenerative Pulse Translating Circuit," now Patent 2,801,345, the application of Theodore H. Bonn and Joseph D. Lawrence, Jr., Serial No. 528,419, filed August 15, 1955, entitled "Magnetic Cores for Gates, Buffers and Function Tables," and Patent 2,774,956, entitled "Magnetic Gating Circuit for Controlling a Plurality of Loads." The present case is directed broadly to improved gate-buffer chains, such as may, for instance, be utilized in various logical operations, as distinguished from the gates and buffers, per se.

In electronic computers and/or data translating systems, it is customary to use chains of gates and buffers, but difficulty has arisen in the case of computing and/or data translating systems in arranging the array of gates and buffers. While the magnetic amplifier has been known for many years, and while magnetic gates and buffers can be built from a plurality of individual magnetic amplifiers, such a system tends to become extremely complex. One object of this invention is to disclose an improved arrangement of magnetic gates and buffers which is very simple as compared to prior arrangements suggested heretofore.

Another object of the invention is to provide chains of magnetic gates and buffers which are simple in design and reliable in operation.

An additional object of the invention is to provide chains of magnetic gates and buffers which enable a computing and/or data translating system to be built therefrom in a much more simple manner than has heretofore been possible.

It follows from the foregoing objects that computing and/or data translating systems made up of the gates and buffers herein disclosed, would be much smaller in size, easier to understand and repair, and effective in operation, as well as lower in cost, than the prior art devices, for performing computing operations.

Other objects and advantages of the invention will become apparent as this description proceeds.

Briefly speaking, the invention employs a plurality of magnetic cores each with a plurality of coils thereon. A gate is normally composed of a number of coils on different ones of these cores connected in series and so arranged that when all of the cores are concurrently subjected to a given flux change, current will flow through the series circuit, otherwise not. A plurality of these series circuits may be buffed together in a buffer. At each stage along the chain, amplifying means preferably in the form of a transistor is included. This is desirable since in a complete computing system there may be hundreds or thousands of gate-buffer chains cascaded together and signals would in fact become attenuated to extinction unless periodically amplified. In addition to performing the function of power amplification, the active or amplifying elements (transistors, magnetic amplifiers, etc.) also serve to cause an impedance to appear across the magnetic or gating coils, which impedance can be high or low in accordance with a signal. Further details will appear as the description proceeds.

The foregoing objects, advantages, construction and operation of the present invention will become more readily apparent from the following description and accompanying drawings, in which.

An electronic computer and/or data translating system is customarily composed of a large number of gate-buffer chains cascaded together, with large numbers of these chains feeding a plurality of other chains, and there may be plurality of still other chains which are buffed into the input of any particular chain. As a result, the array is extremely complex. Instead of showing a complete computer, it is sufficient, to enable those skilled in the art to understand the principles of this invention, to show how one of these gate-buffer chains may be applied to a half adder comprising one typical component of a computer system. Before proceeding to a description of the invention, a conventional form of half adder will be described in order to lay a foundation for showing how the invention may be applied thereto.

Figure 1:
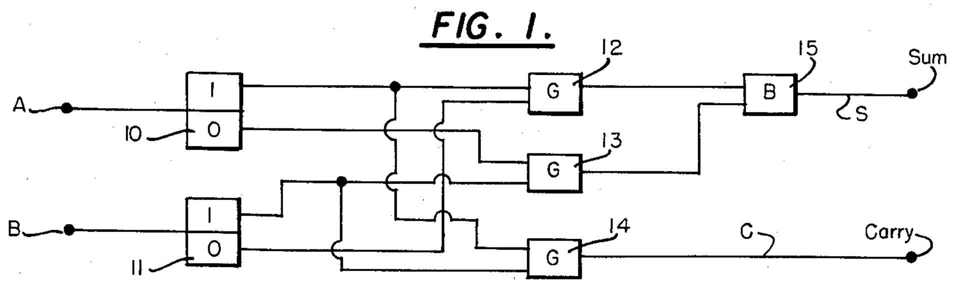
Figure 1 is a block diagram of a conventional half adder used for the purpose of showing how the invention may be applied thereto.

Figure 1 is a conventional form of half adder having two input circuits 10 and 11 which have two inputs A and B respectively, for receiving the signals to be added. Normally these signals are in the form of pulses. If a signal is received at either input alone, it is desired to energize the sum output S, but not the carry output C. If both inputs are simultaneously energized, there should be a signal at carry output C but none at sum output S. If neither input is energized, no signals should appear at either S or C. The circuits 10 and 11 (hereinafter more fully shown in Figure 3), are so constructed that each provides two outputs therefrom, these outputs being respectively shown as emerging from the 1 and 0 side of the circuit. In the event there is no input signal at A, there will be a signal from the 0 side of circuit 10 but no signal from the 1 side thereof. In event there is a signal at A, there will be a signal from the 1 side of circuit 10 but no signal from the 0 side thereof. The same is true for circuit 11, that is, if there is no signal at input B, there is an output from the 0 side of the circuit 11 but none from the 1 side; and if there is a signal at input B there is a signal from the 1 output side thereof but no signal from the 0 side thereof. Gate 12 receives signals from the 1 side of circuit 10 and from the 0 side of circuit 11. Gate 13 is fed from the 0 side of circuit 10 and the 1 side of circuit 11; while gate 14 is fed from the 1 side of circuit 10 and the 1 side of circuit 11. A buffer 15 is also provided, the said buffer having two inputs coupled respectively to the outputs of gates 12 and 13.

In event there are no input signals at either of input terminals A or B, none of the gates 12, 13 or 14 will allow flow of current therethrough since at least one of the inputs at each gate is not energized. Hence, there can be no output at either the sum output terminal S or the carry output terminal C. In event input A is energized and B is not, there will be a signal from the 1 side of circuit 10 and from the 0 side of circuit 11, thus energizing gate 12 and allowing current to flow therethrough to buffer 15. Since if either input of the buffer is energized there will be an output therefrom, there will accordingly be a sum output at S. Gate 14 is fed from the 1 side of circuit 11 and since there is no signal from that side of the circuit, no current will flow through gate 14, whereby there will be no carry output at C. In event input B is energized but input A is not, there will be signals from the 0 side of circuit 10 and the 1 side of circuit 11, thus energizing both inputs of gate 13. At least one input of each of gates 12 and 14 will not be energized. Hence, current may flow only through gate 13 and will feed buffer 15. Since if either input of that buffer is energized there will be a signal at its output, the sum output S will again be energized but the carry output C will not. In event both inputs A and B are energized, the 1 side of both circuits 10 and 11 will be energized, thus providing signals on both inputs of gate 14 allowing that gate to be conducting and producing a signal at carry output C. However, at least one of the inputs of each of gates 12 and 13 will not be energized and therefore there will be no signal from either of said gates, and consequently no input to buffer 15 and no sum output at S.

Circuits 10 and 11 may be of the type shown in the copending application of William J. Bartik, entitled "Electrical Circuit Having Two or More Stable States," Serial No. 504,974, filed April 29, 1955; or of the type shown in my prior copending application entitled "Electrical Circuit With Two Stable States," Serial No. 497,548, filed March 29, 1955. Both of these applications disclose flip-flop circuits with set and reset inputs, as well as two separate outputs. These circuits have two stable states. Energizing the set input places the device in a first stable state wherein there are pulses at the first output but none at the second output. The device remains in this stable state until the reset input is energized whereupon pulses appear at the second output but not at the first.

Figures 2, 5, 5A:
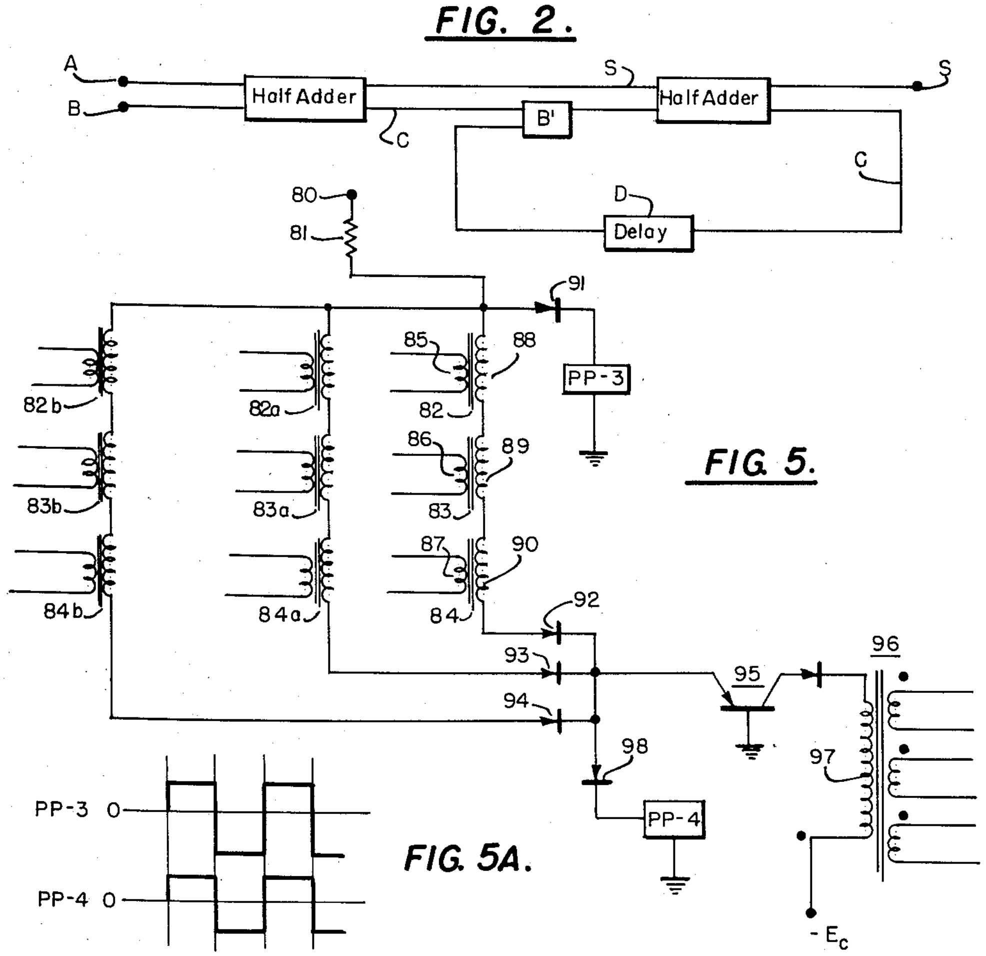
Figure 2 is a conventional full adder, used for the same purpose as Figure 1.
Figure 5 is a schematic diagram of a modified form of gate-buffer chain in accordance with the present invention.
Figure 5A is a timing diagram for the circuit of Figure 5.

Figure 2 shows how two of the half adders of Figure 1 may be interconnected to form a full adder. A buffer B′ may be employed in connection with a suitable delay line D. Otherwise the circuit is obvious and those familiar with half adders and full adders can, from the preceding as well as the following description contained in this application, readily see how Figure 2 may be arranged to operate.

Figure 3:
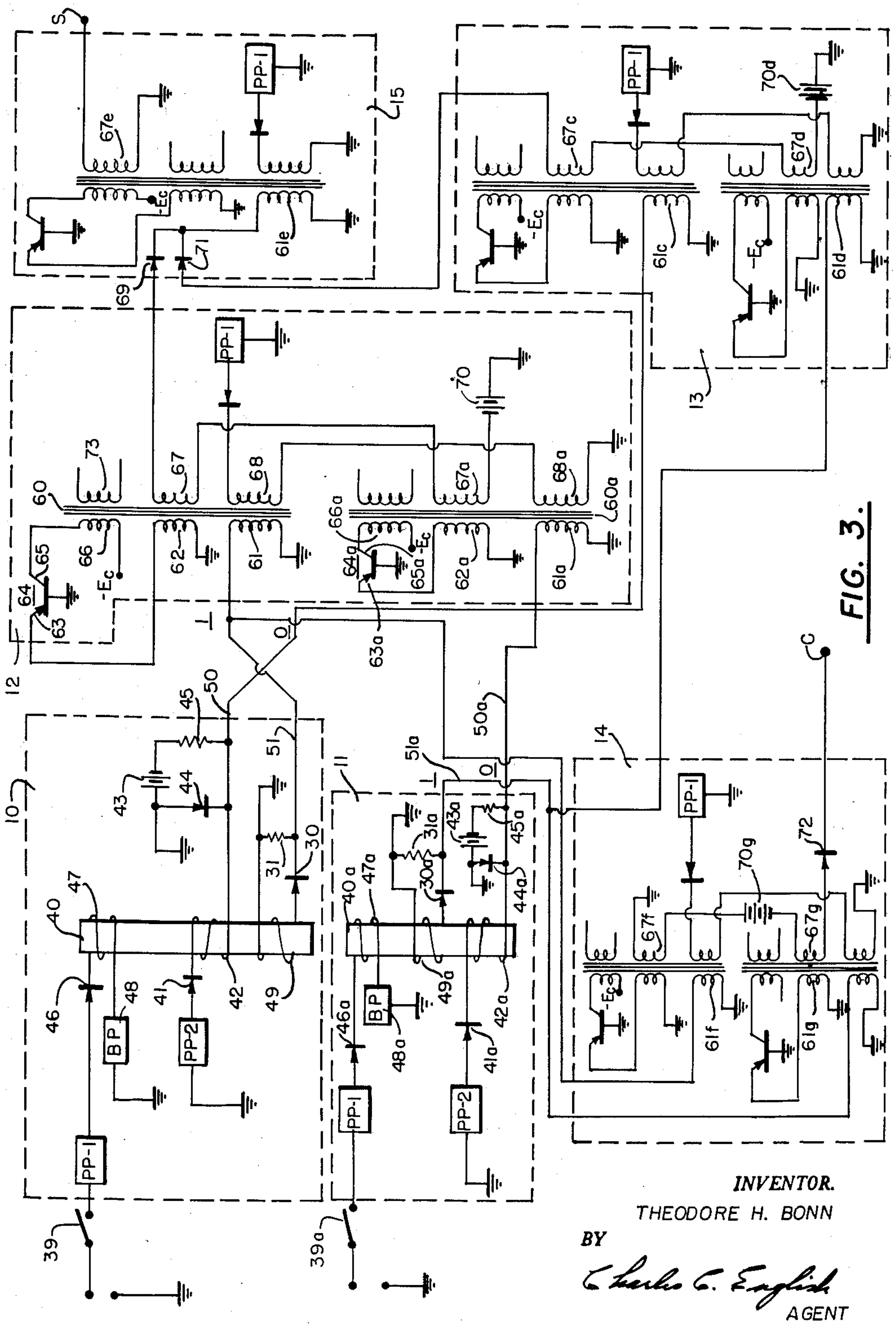
Figure 3 is a schematic diagram of the half adder of Figure 1 utilizing a gate-buffer chain in accordance with one form of the present invention.

One possible arrangement comprising the circuit of block 10, for instance (Figures 1 and 3), is illustrated in Figure 3, and particular attention is therefore now invited to Figure 3. It is understood that the device of the said block 10 forms no part of the invention, and the following description is accordingly given as background information to enable a more complete understanding of the circuit of Figure 3. The particular circuit for block 10, for instance, now to be described, takes the form of a magnetic flip-flop, but it must be stressed that the input signals for the novel gate-buffer chains comprising the present invention may in fact come from other sources, including the outputs of computing circuits similar to those described in the present application.

Figure 4:
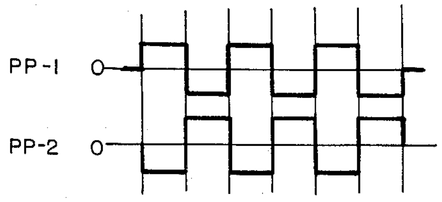
Figure 4 is a timing diagram for the device of Figure 3.

Referring now to Figure 3, it will be noted that the circuit in block 10 thereof has two outputs 50 and 51 and only one input 39. When the input 39 is energized, pulses appear only at the first output 51, and when the input 39 is not energized pulses appear only at the second output 50. The circuit 10 has a core 40 (composed of a magnetic material preferably exhibiting a substantially rectangular hysteresis loop), a power winding 42, an output winding 49, and an input winding 47. Sources PP–1 and PP–2 comprise square wave, sine wave, or other alternating energization sources which are out of phase with each other, whereby one goes positive when the other goes negative, all as shown in Figure 4. Blocking pulse generator 48 produces a train of positive pulses which occur in phase with (and of the same duration as) positive excursions of source PP–2. Source 48 has no negative excursions.

Let us assume, for purposes of illustration, that the core 40 has remained at or above positive remanence for a substantial period of time, while the switch 39 remains open. In this situation the operation of the device is as follows: Coil 47 is not energized. Every positive excursion of source PP–2 effects current flow through rectifier 41, and coil 42 to output 50. This drives the core 40 from positive remanence to positive saturation. After each positive excursion of source PP–2, the core returns to positive remanence. There is, accordingly, a signal at output 50. Inasmuch, however, as there is very little change of flux in the core 40 during these operations, substantially no potential is induced in output coil 49 whereby no signal appears at output 51.

If it should now be assumed that switch 39 is closed so that the next positive pulse of source PP–1 flows through rectifier 46, coil 47 and blocking pulse generator 48 to ground, the action will be as follows, remembering that the positive excursion of source PP–1 occurred during an interval when the potential across the blocking pulse generator 48 was zero and at a time when source PP–2 was negative and was therefore cutting off rectifier 41. Positive pulses from source PP–1 flowing through coil 47 will revert or reset core 40 from positive to negative remanence. During this flipping operation, there will, of course, be a change of flux in coil 49, but rectifier 30 is connected to oppose the flow of output current in this particular instance, whereby no current flows through resistor 31 or to output 51. However, the next positive-going excursion of PP–2, flowing through rectifier 41 and coil 42, will tend to drive the core back from negative remanence to positive remanence. Coil 42 will have high impedance during this action and there will be a large change of flux in core 40. Therefore, a relatively large potential is induced in coil 49 causing current to flow through rectifier 30 and resistor 31, thereby to produce a pulse at output 51. The current flowing through coil 42 at this time will be small and it will be cancelled by the sneak suppressor 43—44—45, i.e. the battery 43 tends to cause a flow of current through the rectifier 44 and the resistor 45 which is equal and opposite to the sneak current tending to flow through coil 42, and therefore cancels the said sneak current so that none of it appears at the output 50.

Summarizing the foregoing, it will be appreciated that when input switch 39 is open, pulses appear at output 50 but not at output 51. On the other hand, when switch 39 is closed, there will be pulses at output 51 but none at 50. The circuit 11 of Figures 1 and 3 is identical in construction and operation with the circuit 10 and like parts bear similar reference numerals, the only exception being that, in connection with circuit 11, the reference numbers bear the subscript *a*.

It is clear from the foregoing description that in the case of every binary signal fed to the input circuits of blocks 10 and 11 of Figures 1 and 3, both of these circuits 10 and 11 will have output pulses timed to occur in synchronism with each other. This follows since all outputs of circuits 10 and 11 can occur only during positive excursions of source PP–2. Whereas two blocks marked PP–2 are shown, it is understood that these would normally be combined into a single alternating current source feeding both coils 42 and 42*a*. Likewise, throughout Figure 3, a number of sources marked PP–1 are shown, but in an actual circuit only one such source need be provided, and this single source could then feed its pulses to all the coils to which the several sources PP–1 are connected.

Having thus described the input circuits 10 and 11 of Figures 1 and 3, a description will now be given of one of the gates 12, 13 or 14, it being understood that all three of these gates are identical so far as their internal connections are concerned, so that a description of one thereof will serve as a description of all. It is noted that these gates are made up of two pulse translating systems which follow the teachings of my prior copending application Serial No. 530,301, filed August 24, 1955, and entitled "Regenerative Pulse Translating Circuit."

The gate 12 has a magnetic core 60 which may have either a linear B–H curve or be composed of material having a substantially rectangular hysteresis loop. An input coil 61 wound on core 60 is fed by one of the inputs to the gate 12. Regeneration coil 62 feeds the input 63 to the transistor 64. In this case the transistor has a grounded base electrode and the emitter electrode constitutes the input 63. The collector electrode 65 feeds an amplifying coil 66 which is returned to a negative source of potential $-E_c$. The latter source is provided for supplying negative operating potential to the collector electrode 65. An output coil 67 is also wound on the core 60.

If it be assumed that the core 60 has a rectangular hysteresis loop and is initially at substantially negative remanence, a pulse fed into input coil 61 will drive the core a short distance up its hysteresis loop. The small change of flux thus produced will induce a potential in regeneration coil 62 which will be amplified by the transistor 64 and fed to the amplifying coil 66. Current flowing in coil 66 will further increase the flux in the core 60, whereby an even larger potential is induced in regeneration coil 62, and this increased potential will be further amplified by the transistor 64 and fed to the amplifying coil 66 to thus drive the core 60 farther up the hysteresis loop. This regenerative process will build up, and the core 60 will move rapidly to positive saturation, at which time no further potential is induced in regenerative coil 62 and the regenerative process stops. Consequently, the core returns to positive remanence. In the meanwhile, a potential was developed in output coil 67.

The foregoing action takes place, of course, only during one of the positive excursions of source PP–2 since it is the said source PP–2 which ultimately provided a signal at input coil 61. At the conclusion of the positive excursion of source PP–2, source PP–1 will feed a pulse through coil 68 tending to reset the core 60 to negative remanence. This latter action will induce potential in coil 67 but that potential cannot serve any useful purpose since the rectifier 69 is so connected that it inhibits any reverse current flow, due to said induced potential, to pass therethrough or through coil 67. It follows, therefore, that each time input coil 61 is energized by the output circuit 51, there will be a potential induced in coil 67 which is in proper direction to pass current through rectifier 69, and following this action, the source PP–1 will pass a resetting current through coil 68 which also tends to induce a potential in coil 67 but in the wrong direction to allow flow of current through rectifier 69.

Another pulse translating device is included in gate 12 and bears reference numbers 60*a* through 68*a*. This pulse translating system is identical in construction and mode of operation to the system 60 to 68 inclusive, the only difference being that the coil 61*a* is driven by the output 50*a* of circuit 11. It is also driven only during positive excursions of source PP–2, as shown in Figure 4. The coils 67 and 67*a* of the two pulse translating devices are in series with each other as well as in series with rectifier 69 and battery 70. The potential induced in these coils is regulated by inherent action of the pulse translating systems themselves and the maximum potential induced in either coil individually is equal to the potential of battery 70. The battery 70 normally cuts off rectifier 69 so that if one coil 67 or 67*a* alone is energized, the total potential in the circuit will be zero inasmuch as the potential of the said one coil will exactly cancel that of the battery 70. On the other hand, if both coils 67 and 67*a* concurrently have potentials induced therein, during a positive excursion of source PP–2, current will flow through the circuit including the rectifier 69 and thus energize the buffer 15.

The gate 13 is identical in every respect to the gate 12 except that the input coils 61*c* and 61*d* are respectively energized by outputs 50 and 50*a* of input circuits 10 and 11 respectively. When positive pulses occur on both wires 50 and 51*a* simultaneously, both coils 61*c* and 61*d* are simultaneously energized, thus producing outputs in coils 67*c* and 67*d* simultaneously which overcome the potential of battery 70*d* and cause a flow of current through rectifier 71 of the buffer 15 thus energizing the latter. The buffer 15 constitutes, in addition to the rectifiers 69 and 71, a pulse translating device similar to that already described in connection with gate 12. Whenever a signal appears at the input coil 61*e* there will be an amplified output signal in the output coil 67*e* and therefore a signal at the sum output S.

The purpose of battery 70 is to prevent an input to 61*e* from occurring when only one of the cores 60 or 60*a* is energized. It should be observed that when a core is not energized it represents a high impedance. Therefore, even without 70 or 70*d* it would in many cases not be possible to deliver sufficient energy to activate 61*e* if only one of the pair 67 or 67*a* were activated. In many cases, therefore, it would be possible to do without the battery or the battery voltage may not be critical.

The gate 14 is identical with gates 12 and 13 except that the input coils 61*f* and 61*g* are respectively energized by outputs 51 and 51*a* respectively of circuits 10 and 11 respectively. When source PP–2 produces pulses on both lines 51 and 51*a*, thus energizing both of input coils 61*f* and 61*g*, the potentials induced in coils 67*f* and 67*g* overcome the potential of battery 70*g* and thus cause the rectifier 72 to conduct a positive pulse to the carry output C. If only one of the lines 50 or 51*a* has a positive pulse thereon, only one of the coils 67*f* or 67*g* will have a potential induced therein, and the potential of battery 70*g* will not be overcome whereby no current will flow through rectifier 72. In event neither line 51 nor line 51*a* is energized, no potential is induced in either coil 67*f* or 67*g* and battery 70*g* cuts off rectifier 72 whereby there is no signal at the carry output C.

There has thus been shown one practical embodiment of a gate-buffer chain constructed to act as a half adder, it being understood that this is merely illustrative of many applications of the gate-buffer chain arrangement of this application. It is also noted that on the several cores, additional coils such as coil 73 have been shown, which additional coils are not coupled to any specific circuit. These latter coils are meant to be merely illustrative of the fact that, in a complicated system, it is often desirable to operate more than one device from a given pulse translating system and consequently additional output coils may be provided for the purpose of operating any other part of the computing or data translating system that appears to be desirable in any particular case.

Figure 5 illustrates another gate-buffer chain which is very economical, has a small number of parts and components and may be constructed for high speed operation. It has a transistor for amplifying pulses as they pass through the system. The pulse generators PP–3 and PP–4 have timing diagrams as shown in Figure 5A. The source 80 comprises a high potential positive source connected through resistor 81 (which has high resistance) to the remainder of the gate-buffer chain whereby elements 80 and 81 form a so-called constant current source. The core elements 82, 83 and 84 form one gate having input or control coils 85, 86 and 87 and power windings 88, 89 and 90 thereon. The cores 82*a*, 83*a* and 84*a* have coils on them arranged the same as the coils on cores 82, 83 and 84, and form another magnetic gate similar to that formed by cores 82 to 84. Likewise, the cores 82*b*, 83*b* and 84*b* have coils thereon similar to those on cores 82, 83 and 84 and form a magnetic gate similar to the magnetic gate 82, 83 and 84.

In order to understand all three of the gates shown, it is merely necessary to describe the single gate 82, 83 and 84. A source of pulses PP–3 feeds the cathode of clamping diode 91 thereby to limit the potential at the lower end of the resistor 81. When source PP–3 goes positive, the potential at the lower end of resistor 81 may rise to the positive potential of source PP–3 and when source PP–3 goes negative, the potential at the lower end of resistor 81 drops below ground. If all the cores 82, 83 and 84 are in a low impedance state, current will flow through the three coils 88, 89 and 90 and thence to transistor 95. The coils may have low impedance in two ways: (*a*) if linear or square loop cores, they may be shunted by an auxiliary means of power amplification or by a switch such as a transistor which is in a low impedance state; (*b*) if square loop cores, they can be at plus remanence and the signal will drive them to saturation along a low impedance path. The balance of the explanation of this circuit will proceed under this assumed mode of operation (*b*) which differs in details but not in spirit from the mode (*a*) explained above.

Thus, assuming that cores 82, 83 and 84 are all at positive remanence, the three coils 88, 89 and 90 will have low impedance under these circumstances and, upon occurrence of a positive going excursion from source PP–3, current will readily flow through the said coils to rectifier 92, and thence to transistor 95. If, however, during a negative excursion of source PP–3 the input coil 85, for instance, is energized thereby to drive core 82 from positive remanence to negative remanence, the next subsequent positive-going excursion of source PP–3 will find coil 88 at high impedance, and no current will flow through the said coil 88 or the rectifier 92. Hence, the condition under which the gates 82, 83, 84 will allow flow of current therethrough is that none of the input coils 85, 86 or 87 were energized with a current sufficient to reset any of the cores. If none of the cores were reset, the gate will have low impedance and current will flow therethrough; but if any one core is reset, the gate will present a high impedance and substantially no current will flow therethrough. In like manner, the three coils of gate 82*a*, 83*a* and 84*a* control the flow of current to the rectifier 93; and further, in like manner the three power coils of the gate 82*b*, 83*b*, and 84*b* control the flow of current therethrough to the rectifier 94.

The three rectifiers 92, 93 and 94 constitute a buffer in combination with the transistor 95 which amplifies the signal and feeds it to an output transformer 96. Transformer 96 has an input coil 97 which is returned to a negative source $-E_c$ serving to supply negative collector potential for the transistor 95. Transformer 96, as illustrated, also includes three output coils which may be employed to feed any subsequent component of the computer system.

A rectifier 98, in combination with a source PP–4, is used for cleaning out excess holes or electrons in transistor 95, and is also employed for timing the circuit. Source PP–4 in effect insures that transistor 95 is inoperative during those intervals when source PP–3 is going negative, and consequently insures that pulses appear in the output transformer 96 only during positive excursions of source PP–3. The source PP–3 has a much larger negative component than positive component in order to enable the cores in a long series chain of cores to recover after each operation. In this respect it should be noted that the voltage in the positive-going portion of PP–3 must be equal to or greater than the back voltage of the series chain of such cores during reversion of the cores from $-B_R$ to $+B_R$. If the said positive-going excursion of PP–3 is smaller than this, spurious operation of the gate might result. The negative voltage, however, must be large enough and of sufficient duration to allow *all* cores in the series chain to switch from $+B_R$ to $-B_R$, if desired.

Figures 6, 6A, 7:
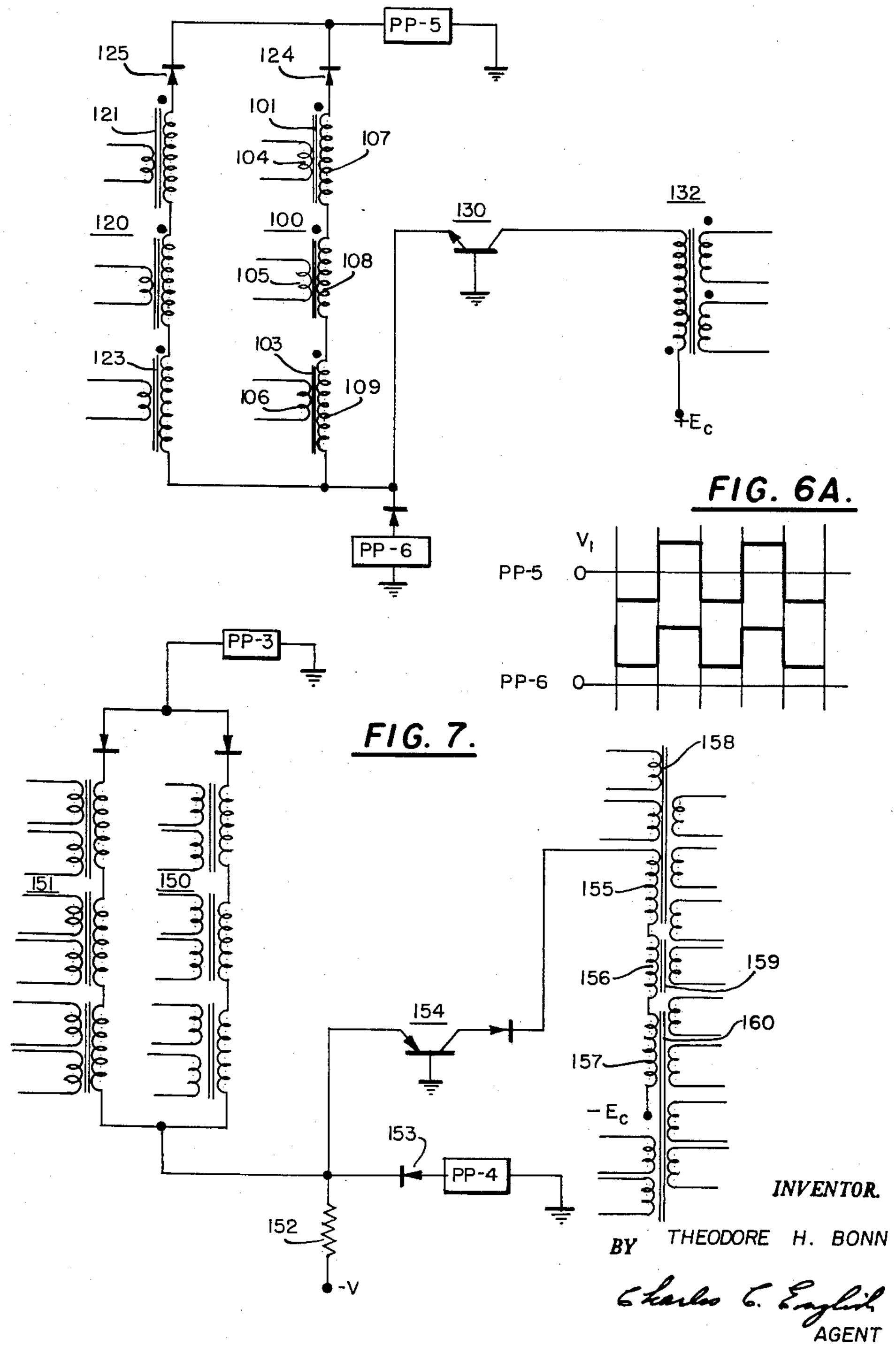
Figure 6 is a schematic diagram of another form of gate-buffer chain in accordance with the present invention.
Figure 6A is a timing diagram for the device of Figure 6.
Figure 7 is a schematic diagram of still another modified form of gate-buffer chain in accordance with the present invention.

A gate-buffer chain arrangement using an NPN transistor is shown in Figure 6. A PNP transistor in the grounded emitter circuit could be used here as well. Square wave generator PP–5 supplies two gates 100 and 120. The gate 100 includes three cores 101, 102 and 103, all preferably having substanitally rectangular hysteresis loops. Input coils 104, 105 and 106 are provided for the purpose of resetting the cores, the same as the input coils of Figure 5. Power windings 107, 108 and 109 have high or low impedance respectively, depending on whether or not the core associated therewith has been reset, and therefore these coils determine the current flowing through the gate.

The gate 120 has three cores 121, 122 and 123 with coils thereon functions similarly to the coils on the cores 101, 102 and 103 respectively. Negative excursions of source PP–5 may flow through rectifier 124 in event gate 100 has low impedance; and through rectifier 125 if gate 120 has low impedance. Such negative signals will be amplified by the transistor 130 and fed to the output transformer 132. Source PP–6 in combination with rectifier 131 will allow the transistor to recover from each pulse flow therethrough so it will be at normal operating condition at the time another pulse may arrive thereafter. Figure 6A shows the waves produced by sources PP–5 and PP–6.

Figure 7 is a buffer-gate-buffer chain utilizing two buffers 150 and 151 which are in fact substantially identical with the two gates 100 and 120. A buffer and a gate, while opposites of each other in one sense, are characterized by the fact that a device which is a buffer in one circuit may be a gate in another. For example, if a signal is represented by 0 instead of 1, a device which would be a gate for the one circuit would be a buffer for the other. Therefore, devices 150 and 151, in this case, constitute buffers since the input terminology is reversed so far as this modified form of the invention is concerned. The outputs of the two buffers 150 and 151 are fed to the emitter electrode of transistor 154. The negative source $-V$, the resistor 152, rectifier 153 and source PP–4 constitute a current limiter and enhance the timing, the same as in connection with Figure 5. Sources PP–3 and PP–4 of Figure 7 have the same relative waveforms as is shown in Figure 5A.

The signal, after being amplified by transistor 154, is fed through three coils 155, 156 and 157 respectively on cores 158, 159 and 160. Each of these cores may have plural inputs fed by different circuits of the entire computer and also have plural outputs feeding various other parts of the system. In fact, one of the output coils on one of the cores 158, 159 or 160 might well be one of the power coils on buffers 150 or 151 in a suitable complex circuit. Moreover, one of the output coils on cores 158, 159 or 160 may feed one of the input coils of the buffers 150 or 151. The circuit normally operates with the cores at positive remanence and they are switched to negative remanence in response to input signals. When all cores of a given series circuit are at positive remanence at the beginning of a pulse from source PP–3, all the power windings of that series have low impedance and current can readily flow therethrough.

The source $-E_c$ provides a potential close to the bottoming potential of transistor 154. When the said transistor 154 produces an output, current flows through the coils 155, 156 and 157 and causes the output coils on cores 158, 159, and 160 to have low impedance to any pulses about to be fed therethrough. When the said transistor does not produce an output current, the coils on cores 158, 159, and 160 will have a high impedance. This illustrates another means of rendering cores either in the high or low impedance state, and such a possible arrangement was in fact referred to previously.

While I have thus described preferred embodiments in accordance with the present invention, many variations will be suggested to those skilled in the art. The foregoing description is therefore meant to be illustrative only, and all such variations and modifications as are in accord with the principles described are meant to fall within the scope of the appended claims.

Having thus described my invention, I claim:

1. A gate-buffer chain comprising a first gate having at least two magnetic cores, separate input means for each core which at predetermined periodic intervals may drive its core a short distance up the hysteresis loop, regeneration means cooperating with each core which in response to the change of flux resulting from the driving of the core said short distance increases the flux in the core to saturation, an output coil on each said core; a second gate having at least two magnetic cores, separate input means for each core which at said predetermined periodic intervals may drive its core a short distance up the hysteresis loop, regeneration means cooperating with each core which in response to the change of flux resulting from the driving of the core said short distance increases the flux in the core to saturation, an output coil on each said core; a first series circuit including the output coils of the first gate as well as a rectifier; a second series circuit including the output coils of the second gate as well as another rectifier; and means for combining together the currents flowing in said series circuits.

2. A gate-buffer chain as defined in claim 1 having threshold means cooperating with each series circuit to prevent flow in the circuit unless all the output coils therein simultaneously have potentials induced therein.

3. A gate-buffer chain comprising a first and second gate each having at least two magnetic cores with substantially rectangular hysteresis characteristics, separate input means for each said core for selectively driving said cores to one remanence point during predetermined periodic intervals, a power coil on each said core, and means connecting the power coils associated with each of said gates in separate series circuits, power means including a constant current source connected to one end of each said series circuits, said constant current source including all of the following: a direct current source, a resistor connected at one end to said source and at its other end to said series circuits, a first rectifier having two electrodes one connected to said other end of said resistor, a pulse generator connected to the other electrode of said rectifier, said first rectifier electrodes being connected in proper direction to allow flow of current from said source to said pulse generator when the latter has lower potential than the former, the pulse generator producing pulses during the spaces between said periodic intervals which at least partially cuts off the rectifier and tends to force current from said source through said gates; means for combining together any currents flowing in the series circuits during the spaces between said periodic intervals, said last-named means including second and third rectifiers respectively in said separate series circuits, and a transistor having its emitter electrode energized by said combined currents, said transistor having an output circuit connected to the collector electrode of the transistor.

4. A gate-buffer chain as defined in claim 3 in which the pulse generator is an alternating current source that causes conduction through said first rectifier during said periodic intervals and thus prevents flow of current through said gates.

5. A gate-buffer as defined in claim 4 in which said other rectifiers have their cathodes connected to the emitter electrode of the transistor, a second rectifier having its anode connected to the emitter electrode of the transistor, and an alternating current source connected to the cathode of said second rectifier, the last-named source being 180 degrees out of phase with the first-named alternating current source.

6. A gate-buffer chain comprising a first gate having at least two magnetic cores with substantially rectangular hysteresis characteristics, separate input means for each said core and which at predetermined periodic intervals may drive its core to one remanence point, a power coil on each said core, and a series circuit including said power coils; a second gate having at least two magnetic cores, separate input means for each said second magnetic core and which at said predetermined periodic intervals may drive its core to one remanence point, a power coil on each said second gate core, and a series circuit including the power coils of said second gate, means including rectifiers in each of said series circuits for combining together any currents flowing in said series circuits during the spaces between said periodic intervals; a transistor having its emitter electrode energized by said combined currents, said transistor having an output circuit connected to the collector electrode of said transistor; and power means including a first alternating current source, tending to supply pulses to said series circuits during the spaces between said periodic intervals, another rectifier having its anode connected to said emitter electrode, and another alternating current source which feeds the cathode of said other rectifier with a potential 180 degrees out of phase with that which said first source supplies to said gates.

7. A gate-buffer chain comprising a first gate having at least two magnetic cores with substantially rectangular hysteresis characteristics, separate input means for each core and which at predetermined periodic intervals may drive its core to one remanence point, a power coil on each core, and a series circuit including said power coils; a second gate having at least two magnetic cores, separate input means for each core and which at said predetermined pediodic intervals may drive its core to one remanence point, a power coil on each said second gate core, and a series circuit including the power coils of said second gate; power means including a first alternating current source which tends to pass pulses through said series circuits during the spaces between said periodic intervals; means in each of said series circuits for combining together any currents flowing in said series circuits during the spaces between said periodic intervals, a transistor of the NPN type having an emitter electrode energized by said combined currents, said transistor having an output circuit connected to the collector electrode of said transistor, said output circuit normally impressing a positive operating potential on said collector electrode, a rectifier in each of said series circuits having such polarity as to allow negative potential from said first source to be impressed on said emitter electrode when said gates have low impedance, another rectifier having its cathode connected to the emitter electrode of said transistor, and another source of pulses which is normally positive but which increases its positive potential when said first source goes positive and thus allows the transistor to recover to normal during positive excursions of said first source.

References Cited in the file of this patent

UNITED STATES PATENTS

| | | |
|---|---|---|
| 2,695,993 | Haynes | Nov. 30, 1954 |
| 2,696,347 | Lo | Dec. 7, 1954 |
| 2,742,632 | Whitely | Apr. 17, 1956 |
| 2,747,110 | Jones | May 22, 1956 |
| 2,778,006 | Guterman | Jan. 15, 1957 |
| 2,806,648 | Rutledge | Sept. 17, 1957 |
| 2,840,801 | Beter et al. | June 24, 1958 |
| 2,843,317 | Steagall | July 15, 1958 |
| 2,846,671 | Yetter | Aug. 5, 1958 |
| 2,857,586 | Wylen | Oct. 21, 1958 |